May 25, 1954
W. J. S. JOHNSON
2,679,413
COUPLING DEVICE
Filed July 1, 1949
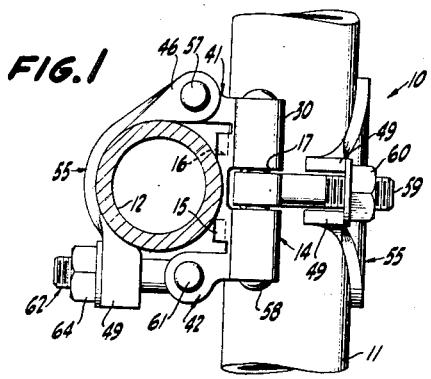
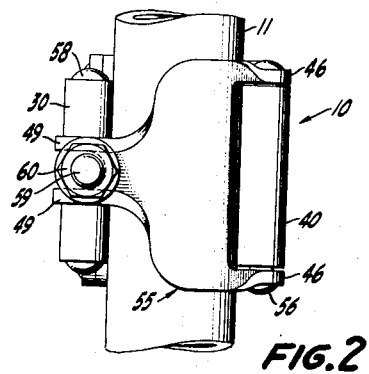
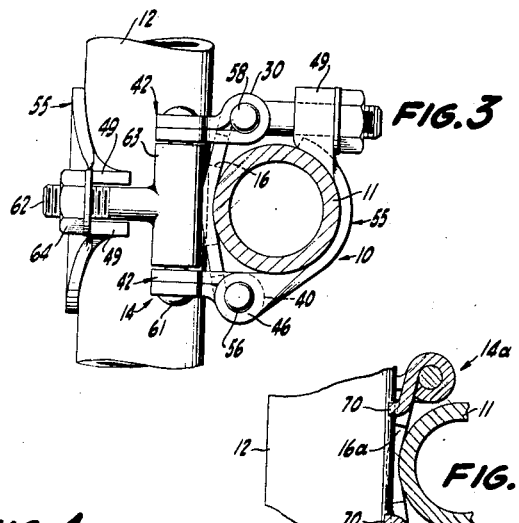
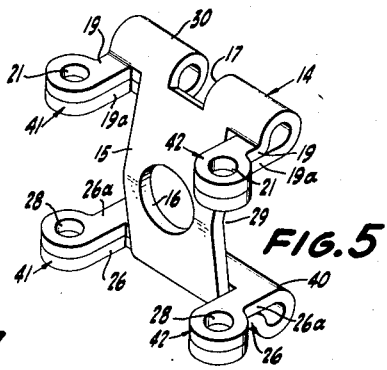
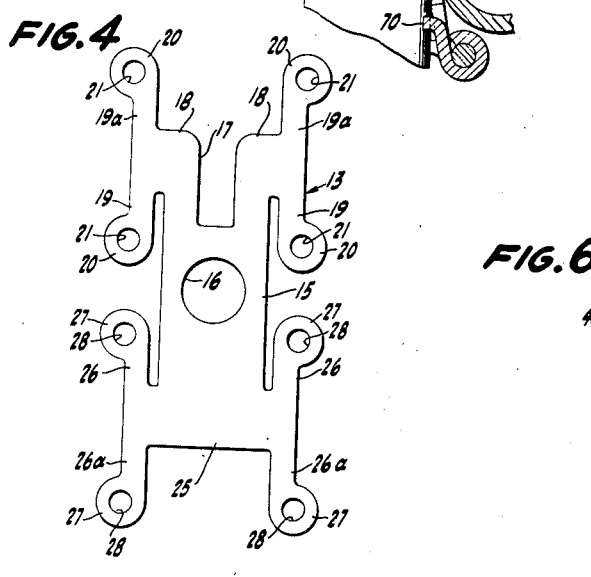
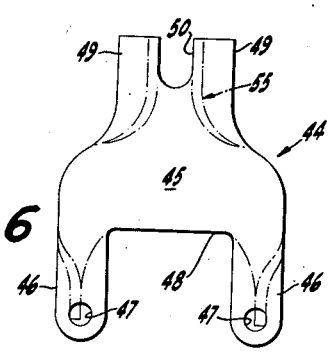
INVENTOR.
WALLACE J. S. JOHNSON
BY
Mellin + Hanson
ATTORNEYS Patented May 25, 1954

2,679,413

UNITED STATES PATENT OFFICE 2,679,413

COUPLING DEVICE

Wallace J. S. Johnson, Berkeley, Calif., assignor to Up-Right, Inc., Berkeley, Calif., a corporation of California Application July 1, 1949, Serial No. 102,542

4 Claims. (Cl. 287—54)

This invention relates to a coupling device. More particularly, it relates to a coupling device for coupling together tubular scaffolding members in right-angular or other desired relationship.

It is an object of the present invention to provide a coupling device which is adapted to couple together tubular scaffolding members in right-angular or other desired relationship, such coupling device being simple in its construction and easy to manipulate and operate.

It is a further object of the invention to provide a right-angle coupling device for tubular scaffolding members, such coupling device being fabricated from sheet metal by a minimum of cutting and other forming operations.

It is a still further object of the invention to provide a coupling device of the character described, which is adapted to couple tubular scaffolding members in right-angular relationship, such coupling device being fabricated of sheet metal and involving a minimum number of working parts and being adapted to securely and firmly clamp together tubular scaffolding members.

These and other objects of the invention will be apparent from the ensuing description and the appended claims.

The invention is exemplified in the following description and illustrated by way of example in the accompanying drawings, in which:

Fig. 1 is a view in elevation of the coupling device of the invention, showing it as coupling together a pair of tubular scaffolding members in right-angular relationship.

Fig. 2 is a view in elevation as seen from the right of Fig. 1.

Fig. 3 is a view as seen from the bottom of Fig. 1.

Fig. 4 is a plan view of the blank used in fabricating the central member.

Fig. 5 is a perspective view of the fabricated, finished central member as formed from the blank of Fig. 4.

Fig. 6 is a plan view of the blank used in fabricating the clamping caps.

Fig. 7 is a fragmentary view of a modified form of the invention.

Referring now to the drawings, the coupling device is generally designated as 10 and it is shown in Figs. 1, 2 and 3 as coupling together a pair of tubular scaffolding members 11 and 12 in right-angular relationship.

Referring now more particularly to Figs. 4 and 5, a blank 13 is shown in Fig. 4 which is formed for the purpose of fabricating a centerpiece or central member 14 which is shown in Fig. 5. The blank 13, as illustrated, comprises a central body portion 15 having an approximately circular hole 16 formed therein. Above the hole, as viewed in Fig. 4, the body portion is recessed at 17, and the blank is formed with arms 18 extending at right angles to the longitudinal axis of the body portion 15. The arms 18 are bifurcated, as illustrated, to provide ears 19 and 19a and at its outer end each ear is formed with a circular boss 20 in which a circular hole 21 is formed. At its other end, the body portion 15 is integral with arms 25 which, like the upper arms 18, are disposed at right angles to the longitudinal axis of the body portion and are bifurcated to provide ears 26 and 26a, each of which is formed at its outer end with a circular boss 27 having a circular hole 28 formed therein.

The blank 13 is preferably fabricated of sheet metal and most advantageously of aluminum or a suitable alloy of aluminum which provides adequate strength, ductility and properties which lend themselves to forming operations such as cutting, stamping, bending and drawing.

Referring now to Fig. 5, the body portion 15 is bent slightly to provide a solid angle 29 bisecting the hole 16. If desired, the bend in the body portion 15 may be along a radius to provide a cylindrical section, but the concave-convex contour provided by simple bending accomplishes the purpose explained hereinafter. The ears 19 are bent through approximately a right angle, as illustrated, so as to lie in the same plane. The ears 19a are bent so that they overlie the ears 19 and their holes 21 are in registry with the holes 21 of the ears 19. The arms 18 are bent and curved so that they form a split sleeve 30, the sections of which are separated by a recess 17.

At the other end of the blank 13, the ears 26 are bent forwardly so as to lie in the same plane and the ears 26a are bent so that they overlie the ears 26 and their holes 28 are in registry with the holes 28 in the ears 26. Also, the body portion 15 and arms 25 are bent and curved to form a sleeve 40.

It will be seen that the central member 14 comprises a concave-convex body portion 15 having a medial hole 16 formed therein which is open to the convex face of the body portion; that it is provided with a pair of sleeves 30 and 40 which lie in spaced, parallel planes; that it is also provided with a pair of perforated lugs 41 (formed by ears 19, 19a, 26 and 26a on one side of the body portion) and another pair of lugs 42 (formed by ears 19, etc. on the other side of the body), which lie in spaced parallel planes; and that the planes in which the lugs 41 and 42 lie are perpendicular to the planes in which the sleeves 30 and 40 lie. Obviously, of course, these planes can be made to intersect at any desired angle, as by twisting the lugs 41 and 42.

Referring now to Fig. 6, a blank generally designated as 44 is provided, such blank being of similar metal to the blank 13. The blank itself is shown in Fig. 6 in solid lines, and as there illustrated it is formed with a central body portion 45, depending ears 46, each having a circular hole 47 at its outer end, and the ears 46 are spaced rather widely apart by a recess 48. At its other end, the blank 44 is formed with ears 49 which are spaced apart by a U-shaped recess 50.

The blank 44 thus described and illustrated, is fabricated into a finished clamping member or cap generally designated as 55. This cap is illustrated in Fig. 6 in broken lines. Such fabrication is accomplished by twisting the ears 46 toward one another through an angle of 90° so that they lie in parallel planes with their holes 47 in axial alignment, while the upper ears are similarly twisted toward each other through an angle of 90°.

In assembling the several elements of the coupling device, a single central member 14 and a pair of clamping caps 55 are provided. One of the clamping caps 55, namely, that shown at the right in Figs. 1, 2 and 3, is hingedly mounted on a hinge pin 56 which passes through the holes 47 formed in ears 46 of the clamping cap 55 and through the sleeve 49 formed on the central member 14. The other or left-hand clamping cap 55, as viewed in Figs. 1 and 3, is hingedly mounted on a hinge pin 57 which passes through the holes 47 in the ears 46 of the clamping cap 55 and also through the holes 21 and 28 in lugs 41. Preferably a tubular sleeve or spacer (not shown) is mounted on the hinge pin 57 between the lugs 41. The coupling device is also provided with a hinge pin 58 extending through the split sleeve 30 and with an eyebolt 59 mounted at one end on the hinge pin 58 within the recess 17. The other end of the bolt 59 is received between the ears 49 of clamping cap 55, and a nut 60 is threaded onto the outer end of the bolt 59. By tightening the nut 60, it will be obvious that a pipe or tubular scaffolding member 11 will be firmly clamped between the central member 14 and the right-hand clamping cap 55. A hinge pin 61 passes through holes 21 and 28 in lugs 42 and a bolt 62 is mounted on the hinge pin 61 by means of a sleeve 63. The other end of the bolt 62 is received between the ears 49 of the left-hand clamping cap 55 and a nut 64 is threaded onto the outer end of the bolt 62. It will be obvious that, by tightening the nut 64, a pipe or tubular scaffolding member 12 will be firmly clamped between the central member 14 and the left-hand clamping cap 55.

Referring now to Fig. 7, there is shown a modified form of central member 14a in which the upper and lower ends of the hole 16a (as viewed in Fig. 7) are cut away on both sides to form tabs 70. The tabs 70 are, of course, arcuate and, when bent outwardly, they provide saddles to seat upon the tube 12.

It will thus be apparent that a coupling device is provided which is easily fabricated from sheet metal, such as sheet aluminum and its alloys, by conventional metal forming operations such as cutting, stamping, bending and drawing. The clamping device is simple in its structure and operation. It involves only two major operating or moving elements, namely, the left- and right-hand clamping caps 55, and it also involves only two bolts 59 and 61 and their cooperating nuts for obtaining the clamping action.

Among the particular advantages of the coupling device of the invention are the following: The clamping bolts 59 and 62 are parallel and are spaced 180° apart. Also, hinge pins 56 and 58 are parallel to one another and hinge pins 57 are parallel to one another. Caps 55 are and 61 are parallel to one another. Consequently, symmetrically shaped and loaded. Consequently, the locking action on the tubes 11 and 12 is accomplished by direct pulling forces which are parallel but are spaced 180° apart. A balanced locking action is thus achieved, and the locking force exerted on one tube is directly transferred to the other tube. There is no twisting of the structure by unbalanced forces.

The central member 14 is bent from a single strip of metal of uniform thickness, and it is so shaped as to involve a minimum wastage of material.

The tubes 11 and 12 are clamped very close to one another, being spaced apart less than the thickness of the central member 14. This is due to the provision of the hole 16 and to the fact that this hole assumes an elliptical form, with its major axis parallel to the tube 12, when the body portion 15 is bent. Close proximity of the tubes is desirable to minimize eccentricity of adjacent tubes, but actual contact is undesirable because of denting and abrasion.

Although the coupling device of the invention may be made of any suitable material, a metal such as well known alloys of aluminum is preferred, which has a modulus of elasticity substantially less than that of steel. Thus, suitable aluminum alloys have a modulus of elasticity, one third that of steel. Since the coupling device is designed for the purpose of flexing to conform to the contour of the coupled members, it will be apparent that a more flexible metal is desirable.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the class described comprising a sheet metal element having a generally rectangular body bent into a generally curved configuration to enable the ends of the body to flex toward a tube adapted to be arranged against and along the back of the body and to provide a cradle at the front adapted to receive another tube and position the tube across the body from side to side at approximately right angles to the first tube, said body portion having at least one perforated ear adjacent each corner disposed laterally of the sides of the body, said body having the ends reversely bent to provide knuckles and the ears bent to position them behind the body with their apertures at each side in alignment, said body portion having a central aperture into which a portion of said first named tubing is adapted to project, whereby said tubes may be closely disposed, said central aperture being restricted in size so that said projecting portion of said first tube does not project far enough into said aperture to contact said second tube, openable clamping means swingably mounted in said ears for gripping the tubing disposed along the back of the body, and other openable clamping means swingably mounted in said knuckles for gripping the tubing disposed across the front of the body, whereby the sheet metal element is deformed to assume a position where the forces applied to one tube are equal to the forces applied to the other tube.

2. A device of the class described comprising a sheet metal element having a generally rectangular body bent into a generally curved configuration to enable the ends of the body to flex toward a tube adapted to be arranged against and along the back of the body and to provide a cradle at the front adapted to receive another tube and position the tube across the body from side to side at approximately right angles to the first tube, said body portion having at least one perforated ear adjacent each corner disposed laterally of the sides of the body, said body having the ends reversely bent to provide knuckles and the ears bent to position them behind the body and with the apertures on each side in alignment, openable clamping means swingably mounted in said ears for gripping the tubing disposed along the back of the body, and other openable clamping means swingably mounted in said knuckles for gripping the tubing disposed across the front of the body, whereby the sheet metal element is deformed to assume a position where the forces applied to one tube are equal to the forces applied to the other tube.

3. A device of the class described comprising a sheet metal element having a generally rectangular body bent into a generally curved configuration to enable the ends of the body to flex toward a tube adapted to be arranged against and along the back of the body and to provide a cradle at the front adapted to receive another tube and position the tube across the body from side to side at approximately right angles to the first tube, said body portion having a pair of perforated ears adjacent each corner disposed laterally of the sides of the body, said body having the ends reversely bent to provide knuckles and the ears bent to position the ears of each pair in overlapping abutting relationship and the pairs of ears on each side of the body with their apertures in alignment, openable clamping means swingably mounted in said ears for gripping the tubing disposed along the back of the body, and other openable clamping means swingably mounted in said knuckles for gripping the tubing disposed along the front of the body, whereby the sheet metal element is deformed to assume a position where the forces applied to one tube are equal to the forces applied to the other tube.

4. A device of the class described comprising a sheet metal element having a generally rectangular body bent into a generally curved configuration to enable the ends of the body to flex toward a tube adapted to be arranged against and along the back of the body and to provide a cradle at the front adapted to receive another tube and position the tube across the body from side to side at approximately right angles to the first tube, said body portion having a pair of perforated ears adjacent each corner disposed laterally of the sides of the body, said body having the ends reversely bent to provide knuckles and the ears bent to position the ears of each pair in overlapping abutting relationship and the pairs of ears on each side of the body with their apertures in alignment, openable clamping means swingably mounted in said ears for gripping the tubing disposed along the back of the body, and other openable clamping means swingably mounted in said knuckles for gripping the tubing disposed along the front of the body, said body portion having a central aperture into which a portion of said first named tubing is adapted to project, whereby said tubes may be closely disposed, said central aperture being restricted in size so that said projecting portion of said first tube does not project far enough into said aperture to contact said second tube, whereby the sheet metal element is deformed to assume a position where the forces applied to one tube are equal to the forces applied to the other tube.

References Cited in the file of this patent

UNITED STATES PATENTS

| Number | Name | Date |
|---|---|---|
| 1,783,735 | Marshall | Dec. 2, 1930 |
| 2,088,890 | Winby | Aug. 3, 1937 |
| 2,152,891 | Kohnke | Apr. 4, 1939 |
| 2,194,883 | Burton | Mar. 26, 1940 |
| 2,402,570 | O'Donnell | June 25, 1946 |
| 2,511,035 | Barton | June 13, 1950 |

FOREIGN PATENTS

| Number | Country | Date |
|---|---|---|
| 573,189 | Great Britain | Nov. 9, 1945 |